(12) United States Patent
Charnock et al.

(10) Patent No.: US 8,187,767 B2
(45) Date of Patent: May 29, 2012

(54) POLYMERIC MATERIALS

(75) Inventors: Peter Charnock, Poulton-le-Fylde (GB); John N. Devine, Poulton-le-Fylde (GB); Brian Wilson, Garstang (GB)

(73) Assignee: Victrex Manufacturing Limited, Lancashire (GB)

( * ) Notice: Subject to any disclaimer, the term of this patent is extended or adjusted under 35 U.S.C. 154(b) by 1325 days.

(21) Appl. No.: 10/551,576

(22) PCT Filed: Apr. 1, 2004

(86) PCT No.: PCT/GB2004/001401
§ 371 (c)(1),
(2), (4) Date: Apr. 10, 2007

(87) PCT Pub. No.: WO2004/088778
PCT Pub. Date: Oct. 14, 2004

(65) Prior Publication Data
US 2007/0269700 A1 Nov. 22, 2007

(30) Foreign Application Priority Data
Apr. 2, 2003 (GB) .................................. 0307623.9

(51) Int. Cl.
*H01M 8/10* (2006.01)
(52) U.S. Cl. ........ 429/493; 429/492; 429/491; 429/483; 429/490; 429/479; 429/400
(58) Field of Classification Search .................. 429/493, 429/492, 491, 483, 480, 479, 400
See application file for complete search history.

(56) References Cited

U.S. PATENT DOCUMENTS

| 4,273,903 A | 6/1981 | Rose |
| 5,362,836 A | 11/1994 | Helmer-Metzmann et al. |
| 6,902,801 B2 * | 6/2005 | Charnock et al. ............. 429/494 |
| 7,303,830 B2 * | 12/2007 | Andrews et al. .............. 429/465 |
| 7,799,465 B2 * | 9/2010 | Devine et al. ................. 429/253 |
| 2004/0224202 A1 * | 11/2004 | Bridges et al. ................. 429/30 |

FOREIGN PATENT DOCUMENTS

| EP | 0 382 440 | | 8/1990 |
| JP | 1-198624 | * | 8/1989 |
| JP | 03-014841 | | 1/1999 |
| WO | WO 01 19896 | | 3/2001 |
| WO | WO 02/075835 | * | 9/2002 |
| WO | WO 03/028139 | * | 4/2003 |

OTHER PUBLICATIONS

International Search Report corresponding to International Application No. PCT/GB2004/001401.
Y.S. Kim et al., "*Fabrication and characterization of heteropolyacid (H3PW12O40)/directly polymerized Sulfonated poly(arylene ether sulfone) copolymer composite membranes for higher temperature fuel cell applications*", Journal of Membrane Science, Elsevier Scientific Publ. Companby, Amsterdam, Netherlands, vol. 212, No. 1-2, Feb. 15, 2003, pp. 263-282.

* cited by examiner

*Primary Examiner* — Laura Weiner
(74) *Attorney, Agent, or Firm* — Fay Sharpe LLP

(57) ABSTRACT

A polymer electrolyte membrane or gas diffusion electrode includes an ion-conducting polymeric material which includes moieties of formula (A) which are substituted on average with more than 1 and 3 or fewer groups (e.g. sulphonate groups) which provide ion-exchange sites and hydrogen atoms of said moieties are optionally substituted, wherein each X in said moieties of formula A independently represent an oxygen or sulphur atom. The ion conducting polymeric material is suitably prepared by controllably sulphonating a polymeric material using about 100% sulphuric acid at 34° C. to 36° C.

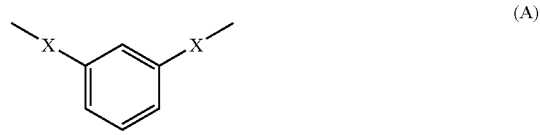

(A)

16 Claims, 2 Drawing Sheets

POLYMERIC MATERIALS

This invention relates to polymeric materials and particularly, although not exclusively, relates to ion-exchange polymeric materials. Preferred embodiments relate to the use of ion-exchange polymeric materials in polymer electrolyte membranes or gas diffusion electrodes of fuel cells.

One type of polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode-Assembly (MEA) of less than 1 mm thickness.

In a PEMFC, hydrogen is introduced at the anode (fuel electrode) which results in the following electrochemical reaction:

Pt-Anode, (Fuel Electrode) $2H_2 \rightarrow 4H^+ + 4e^-$

The hydrogen ions migrate through the conducting PEM to the cathode. Simultaneously, an oxidant is introduced at the cathode (oxidant electrode) where the following electrochemical reaction takes place:

Pt-Cathode (Oxidant Electrode) $O_2 + 4H^+ + 4e^- \rightarrow 2H_2O$

Thus, electrons and protons are consumed to produce water and heat. Connecting the two electrodes through an external circuit causes an electrical current to flow in the circuit and withdraw electrical power from the cell.

One important requirement for an ion-exchange polymeric material for a fuel cell or gas diffusion electrode is that it must be capable of being made using a reproducible method wherein a base polymeric material to be provided with ion-exchange sites can be treated so that the ion-exchange sites are introduced into the base polymeric material to a predetermined level at predetermined positions (and substantially at no positions other than the predetermined positions) on the polymeric material.

It is an object of embodiments of the present invention to address the aforementioned problem.

Another important requirement for an ion-exchange polymeric material for a fuel cell or gas diffusion electrode is that it must be thermally stable over a long period of use in a fuel cell at relatively high temperatures. If a polymeric material was to relatively easily lose ion-exchange groups then this would reduce the conductivity of the material and adversely affect the performance of the fuel cell.

It is an object of the present invention to produce relatively thermally stable ion-exchange polymeric materials.

According to a first aspect of the present invention, there is provided a polymer electrolyte membrane or gas diffusion electrode which includes an ion-conducting polymeric material which includes moieties of formula

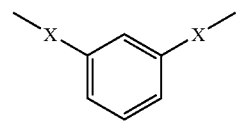

which are substituted on average with more than 1 and 3 or less groups (e.g. sulphonate groups) which provide ion-exchange sites and hydrogen atoms of said moieties are optionally substituted, wherein each X in said moieties of formula A independently represent an oxygen or sulphur atom.

Ion-conducting polymeric materials of the type described have been found to be surprisingly thermally stable. Additionally, increasing the number of electron withdrawing groups on the phenyl ring of repeat unit of formula A may advantageously increase the acidity of the repeat unit.

Said moieties of formula A may be substituted on average with at least 1.5, preferably at least 1.8, more preferably at least 1.9 of said groups. Preferably, said moieties are substituted on average with 1.8 to 2.2, more preferably 1.9 to 2.1 of said groups which provide ion-exchange sites. Preferably, substantially all of said moieties of formula A are di-substituted with groups which provide ion-exchange sites.

Preferably, hydrogen atoms of said moieties other than those substituted with groups to provide ion-exchange sites as described are not substituted.

Said ion-conducting polymeric material is preferably of a type which includes:
(i) phenyl moieties;
(ii) carbonyl and/or sulphone moieties; and
(iii) ether and/or thioether moieties.

Said ion-conducting polymeric material may include a moiety of formula

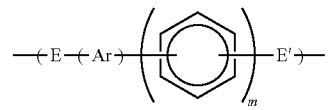

and/or a moiety of formula

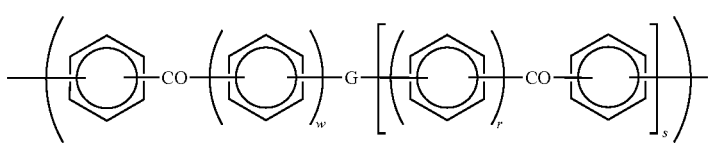

and/or a moiety of formula

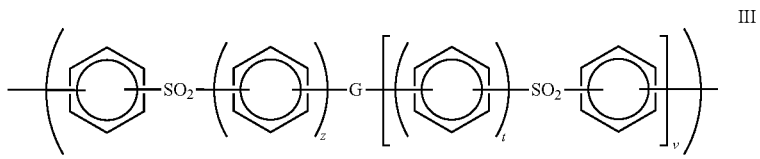

wherein at least some of the units I, II and/or III are functionalised to provide ion-exchange sites, wherein the phenyl moieties in units I, II, and III are independently optionally substituted and optionally cross-linked; and wherein m,r,s,t, v,w and z independently represent zero or a positive integer, E and E' independently represent an oxygen or a sulphur atom or a direct link, G represents an oxygen or sulphur atom, a direct link or a: —O-Ph-O— moiety where Ph represents a phenyl group and Ar is selected from one of the following moieties (i)* or (i) to (x) which is *bonded via one or more of its phenyl moieties to adjacent moieties

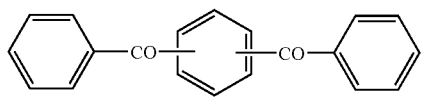 (i)*

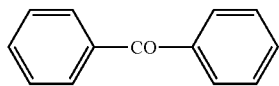 (i)

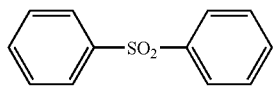 (ii)

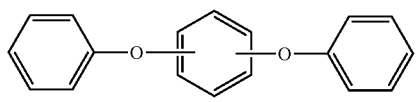 (iii)

 (iv)

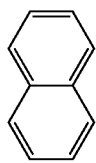 (v)

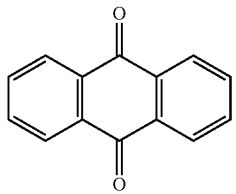 (vi)

-continued

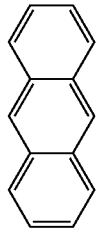 (vii)

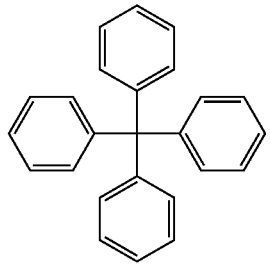 (viii)

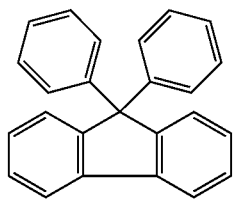 (ix)

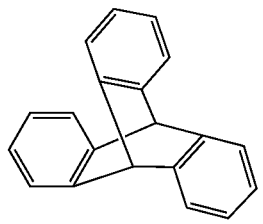 (x)

Unless otherwise stated in this specification, a phenyl moiety may have 1,4- or 1,3-, especially 1,4-, linkages to moieties to which it is bonded.

In (i)*, the middle phenyl may be 1,4- or 1,3-substituted.

In (iii), the middle phenyl ring may be 1,3- or 1,4-substituted.

Preferably, each phenyl moiety in the ion-conducting polymeric material has 1,4-linkages, except for moieties of formula A in said material.

Suitably, to provide said ion exchange sites, said polymeric material is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or anion exchange membrane. Further still, the aromatic moiety may contain a hydroxyl group which can be readily elaborated by existing methods to generate —OSO$_3$H and —OPO$_3$H$_2$ cationic exchange sites on the polymer.

Preferably, said ion-conducting polymeric material is sulphonated. Preferably, the only ion-exchange sites of said ion-conducting polymeric material are sites which are sulphonated.

References to sulphonation include a reference to substitution with a group —SO$_3$M wherein M stands for one or more elements selected with due consideration to ionic valencies from the following group: H, NR$_4^{y+}$, in which R$^y$ stands for H, C$_1$-C$_4$ alkyl, or an alkali or alkaline earth metal or a metal of sub-group 8, preferably H, NR$_4^+$, Na, K, Ca, Mg, Fe, and Pt. Preferably M represents H.

Where a moiety A includes at least two groups which provide ion-exchange sites, such groups may be ortho or para to the X-atoms (i.e. -the phenyl group of moiety A is 4,6-substituted). Moieties A may not generally be substituted in the position which is meta to both X-atoms.

Preferably, the majority (e.g. at least 80%, preferably at least 90%) of the two groups are arranged ortho or para as described. In some cases, however, it is possible for the phenyl groups to be substituted in the 2,5-positions, but preferably less than 20%, more preferably less than 10% of such groups are 2,5,-substituted.

In some cases, it may be possible to tri-substitute respective A moieties. In this case, the third substituent may be arranged between the two X-atoms in moiety A.

Said polymeric material may include more than one different type of, repeat unit of formula I; more than one different type of repeat unit of formula. II; and more than one different type of repeat unit of formula III.

Said moieties I, II and III are suitably repeat units. In the polymeric material, units I, II and/or III are suitably bonded to one another—that is, with no other atoms or groups being bonded between units I, II, and III.

Unit A is preferably a part of unit I, II or III.

Where the phenyl moieties in units A, I, II or III are optionally substituted, they may be optionally substituted by one or more halogen, especially fluorine and chlorine, atoms or alkyl, cycloalkyl or phenyl groups. Preferred alkyl groups are C$_{1-10}$, especially C$_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional 'substituents of the phenyl moieties in units A, I, II or III include alkyls, halogens, C$_y$F$_{2y+1}$ where y is an integer greater than zero, O—R$^q$ (where R$^q$ is selected from the group consisting of alkyls, perfluoralkyls and aryls), CF=CF$_2$, CN, NO$_2$ and OH. Trifluormethylated phenyl moieties may be preferred in some circumstances. However, as stated, the phenyl moiety in moiety A and in I, II and III when provided are preferably not further substituted.

Where said polymeric material is cross-linked, it is suitably cross-linked so as to improve its properties as a polymer electrolyte membrane, for example to reduce its swellability in water. Any suitable means may be used to effect cross-linking. For example, where E represents a sulphur atom, cross-linking between polymer chains may be effected via sulphur atoms on respective chains. Alternatively, said polymer may be cross-linked via sulphonamide bridges as described in U.S. Pat. No. 5,561,202. A further alternative is to effect cross-linking as described in EP-A-0008895. Said ion-conducting polymeric material is preferably not cross-linked.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the first material does not include a —S— moiety. Preferably, G represents a direct link.

Suitably, "a" represents the mole % of units of formula I in said polymeric material, suitably wherein each unit I is the same; "b" represents the mole % of units of formula II in said material, suitably wherein each unit II is the same; and "c" represents the mole % of units of formula III in said material, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymeric material consists essentially of moieties I, II and/or III, with moiety A being a part of moieties I, II and/or III.

Said polymeric material may be a homopolymer having a repeat unit of general formula

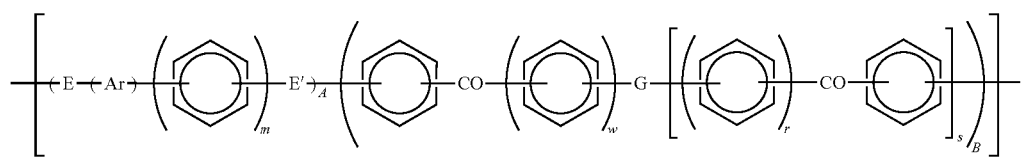

IV or a homopolymer having a repeat unit of general formula

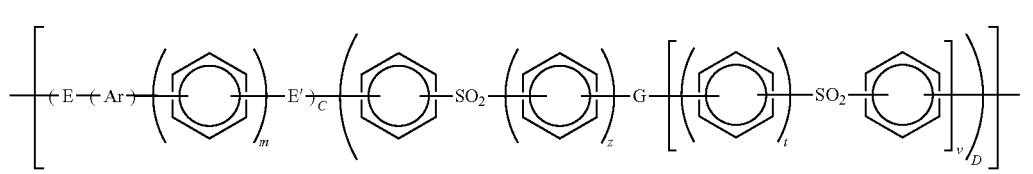
V or a random or block copolymer of at least two different units of IV and/or V provided that repeat units (or parts of repeat unit) are functionalised to provide ion-exchange sites; wherein A, B, C and D independently represent 0 or 1 and E,E',G,Ar,m,r,s,t,v,w and z are as described in any statement herein.

As an alternative to a polymer comprising units IV and/or V discussed above, said polymeric material may be a homopolymer having a repeat unit of general formula

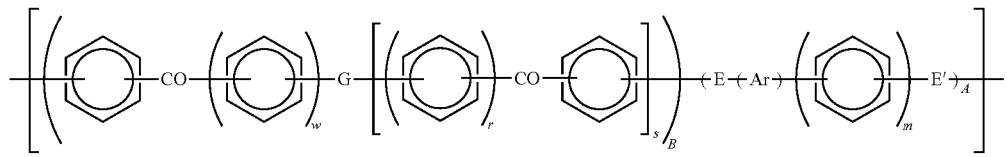
IV* or a homopolymer having a repeat unit of general formula

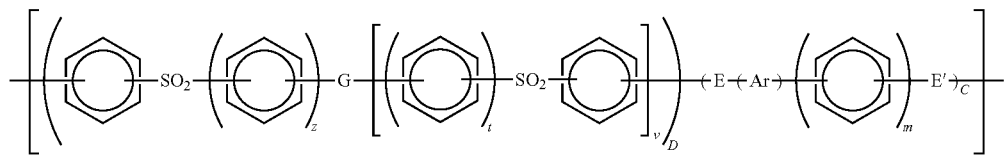
V* or a random or block copolymer of at least two different units of IV* and/or V* provided that one or more repeat units (or parts of repeat units) are functionalised to provide ion-exchange sites; wherein A, B, C, and D independently represent 0 or 1 and E, E', G, Ar, m, r, s, t, v, w and z are as described in any statement herein.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably Ar is selected from the following moieties (xi)* and (xi) to (xxi):

(xi)*

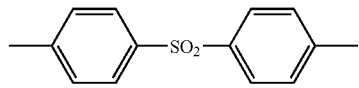

(xi)

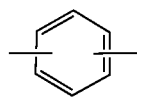

-continued (xii)

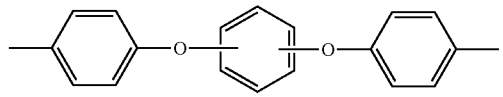

-continued (xiii)

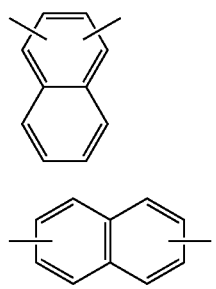

(xiv)

(xv)

(xvi)

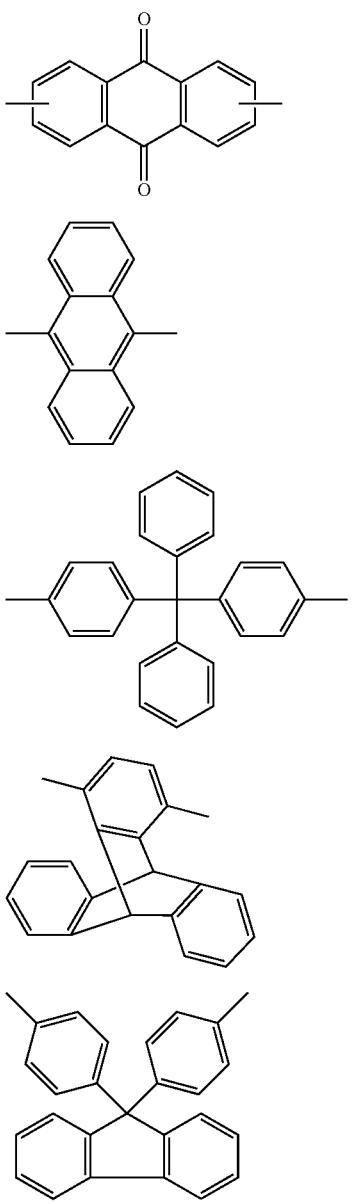

In (xi)*, the middle phenyl may be 1,4- or 1,3-substituted;
In (xiii), the middle phenyl ring may be 1,3- or 1,4-substituted.

In (xiv), the phenyl group may be 1,3 or 1,4-substituted. Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6- moiety.

Preferably, said ion-conducting polymeric material is crystalline or crystallisable.

Unless otherwise stated in this specification, a reference to a crystalline material extends to any material having at least some crystallinity.

The existence and/or extent of crystallinity in a polymer is preferably measured by wide angle X-ray diffraction, for example as described by Blundell and Osborn (Polymer 24, 953, 1983). Alternatively, Differential Scanning Calorimetry (DSC) could be used to assess crystallinity. The level of crystallinity in said polymeric material may be 0% (e.g. where the material is amorphous or crystallisable); or the level of crystallinity may be at least 0.5%, suitably at least 1%, preferably at least 5% weight fraction, suitably when measured as described by Blundell and Osborn. The level of crystallinity in said polymeric material may be less than 20%.

Suitable moieties Ar are moieties (i)*, (i), (ii), (iv) and (v) and, of these, moieties (i)*, (i), (ii) and (iv) are preferred. Preferred moieties Ar are moieties (xi)*, (xi), (xii), (xiv), (xv) and (xvi) and, of these, moieties (xi)*, (xi), (xii) and (xiv) are especially preferred. Another preferred moiety is moiety (v), especially, moiety (xvi). In relation, in particular to the alternative first polymeric materials comprising units IV* and/or V*, preferred Ar moieties are (v) and, especially, (xvi).

One preferred class of polymeric materials may include at least some ketone moieties in the polymeric chain. In such a preferred class, the polymer preferably does -not only include —O— and —SO$_2$— moieties between aryl (or other unsaturated) moieties in the polymeric chain. Thus, in this case, suitably, a polymer of the first aspect does not consist only of moieties of formula III, but also includes moieties of formula I and/or II.

Said ion-conducting polymeric material preferably includes a repeat unit of formula

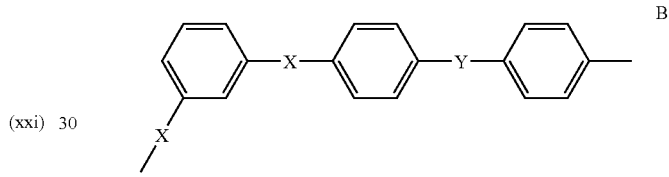

wherein the 1,3-substituted —X-Phenyl-X— moiety is substituted on average with more than 1 and 3 or less groups which provide ion-exchange sites as described above, each X independently represents an oxygen or sulphur atom as, described above, and Y represents a carbonyl or sulphone group. Preferably, Y represents a carbonyl group. Preferably, each X represents an oxygen atom.

In said ion-conducting polymeric material, moiety A is preferably di-substituted as described. Said ion-conducting polymeric material may include other moieties which are functionalised to provide ion-exchange sites. Said ion-conducting polymeric material may be derived from a precursor polymeric material which is suitably not provided with ion-exchange sites. Said precursor material may include moieties which can relatively easily be functionalised to provide them with ion-exchange sites and moieties which are more difficult to functionalise with ion-exchange sites. Relatively easily functionalised moieties include moiety A described above; and other electron rich, relatively non-deactivated units such as multi-phenylene (e.g. biphenylene) moieties or fused ring aromatic (e.g. naphthalene) moieties which are preferably bonded at each end to oxygen or sulphur atoms. Thus, readily functionalised units are unit A and —O— biphenylene-O— moieties. More difficult to functionalise units include units -bonded to sulphone or carbonyl groups (e.g. —O-phenyl-CO and —O-phenyl-SO$_2$—).

Suitably, any —O-phenyl-CO or —O-phenyl-SO$_2$ moieties in said ion-conducting polymeric material are functionalised with ion-exchange sites to a level of less than 10 mole %, preferably less than 5 mole %, more preferably less than 1 mole %. Especially preferred is the case wherein said moieties are, substantially not functionalised with ion-exchange sites. On the other hand, said relatively easily functionalised units may be functionalised with ion-exchanges sites as described, with unit A being di-functionalised as described and multi-phenylene units bonded at each end to oxygen or sulphur atoms being at least mono-functionalised on each phenylene moiety.

When the ion-conducting polymeric material includes moieties of formula A together with —O-biphenylene-O— moieties up to 100 mole % (preferably at least 95 mole %, especially 100 mole %) of moieties A are di-functionalised with ion-exchange sites and up to 100 mole % (preferably at least 95 mole %, especially 100 mole %) of said —O—biphenylene-O— moieties are functionalised with ion-exchange sites.

Preferably, the only moieties in said ion-conducting polymeric material which are functionalised with ion-exchange sites are moieties A and preferably substantially 100 mole % of such moieties are di-functionalised as described.

Preferred polymers are copolymers comprising a first repeat unit which is selected from the following:
(a) a unit of formula IV wherein E and E' represent oxygen atoms, G represents a direct link, Ar represents a moiety of structure (iv), m and s represent zero, w represents 1 and A and B represent 1 provided that said unit includes moiety A, with both X atoms being oxygen atoms. (i.e. -ether-phenyl-metaether-phenyl-ketone-phenyl-);
(b) a unit of formula V wherein E and E' represent oxygen atoms, G represents a direct link, Ar represents a moiety of structure (v), m and s represent zero, w represents 1 and A and B represent 1 provided that said unit includes moiety A, with both X atoms being oxygen atoms (i.e. -ether-phenyl-metaether-phenyl-sulphone-phenyl-);
and a second repeat unit selected from one of the following:
(c) a unit of formula IV wherein E and E' represent oxygen atoms, G represents a direct link, Ar represents a moiety of structure (iv), m and s represent zero, w represents 1 and A and B represent 1 (i.e. -ether-phenyl-ether-phenyl-ketone-phenyl);
(d) a unit of formula IV wherein E represents an oxygen atom, E' represents a direct link, Ar represents a moiety of structure (i), m represents zero, A represents 1, B represents zero (i.e. -ether-phenyl-ketone-phenyl);
(e) a unit of formula V wherein E and E' represent oxygen atoms, G represents a direct link, Ar represents a moiety of structure (iv), m and v represent zero, z represents 1 and C and D represent 1 (i.e. -ether-phenyl-ether-phenyl-sulphone-phenyl-);
(f) a unit of formula V wherein E represents an oxygen atom, E' represents a direct link, Ar represents a moiety of structure (ii), m represents 0, C represents 1, D represents 0 (i.e. -ether-phenyl-sulphone-phenyl-);
(g) a unit of formula V wherein E and E' represents an oxygen atom, Ar represents, a structure (i), m represents 0, C represents 1, Z represents 1, G represents a direct link, v represents 0 and D represents 1 (i.e. -ether-phenyl-ketone-phenyl-ether-phenyl-sulphone-phenyl-);
(h) a unit of formula IV wherein E and E' represent oxygen atoms, G represents a direct link, Ar represents a moiety of structure (iv), m represents 1, w represents 1, s represents zero, A and B represent 1 (i.e. -ether-phenyl-phenyl-ether-phenyl-ketone-phenyl-);
(i) a unit of formula IV wherein E represents an oxygen atom, E' is a direct link, G represents a direct link, Ar represents a moiety of structure (iv), m and s represent zero, w represent 1, A and B represent 1 (i.e. -ether-phenyl-phenyl-ketone-phenyl-);
(j) a unit of formula V wherein E and E' represent oxygen atoms, G represents a direct link, Ar represents a moiety of structure (iv), m represents 1, z represents 1, v represents 0, C and D represent 1 (i.e. -ether-phenyl-phenyl-ether-phenyl-sulphone-);
(k) a unit of formula V wherein E represents an oxygen atom, E' represents a direct link, G represents a direct link, Ar represents a moiety of structure (iv), m and v represent zero, z represents 1, C and D represent 1 (i.e. -ether-phenyl-phenyl-sulphone-phenyl-);
(l) a unit of, formula IV wherein E and E' represent oxygen atoms, G represents a direct link, Ar represents a moiety of structure (v), m represents 0, w represents 1, s represents 0, A and B represents 1 (i.e. -ether-napthalenyl-ether-phenyl-ketone-phenyl-);
(m) a unit-of formula V wherein E and E' represent oxygen atoms, G represents a direct link, Ar represents a moiety of structure (v), m represents 0, z represents 1, v represents 0, C and D represent 1 (i.e. -ether-naphthalenyl-ether-phenyl-sulphone-).

Said ion-conducting polymeric material may include a third repeat unit which may be selected from the above list of second repeat units.

Preferred ion-conducting polymeric materials include a first unit selected from (a) or (b) in combination with a second unit selected from (d) or (f) optionally in combination with (g) (i.e. -ether-phenyl-metaether-phenyl-ketone-phenyl- or -ether-phenyl-metaether-phenyl-sulphone-phenyl- in combination with -ether-phenyl-ketone-phenyl-or -ether-phenyl-sulphone-phenyl-, and, optionally, with -ether-phenyl-ketone-phenyl-ether-phenyl-sulphone-phenyl-.

The most preferred ion-conducting polymeric materials comprise unit (a) in combination with unit (d) i.e. (-ether-phenyl-metaether-phenyl-ketone-phenyl-/-ether-phenyl-ketone-phenyl); unit (a) in combination with units (d) and (g) (i.e. (-ether-phenyl-metaether-phenyl-ketone-phenyl-/-ether-phenyl-ketone-phenyl/-ether-phenyl-ketone-phenyl-ether-phenyl-sulphone-phenyl-); unit (b) in combination with unit (f) (i.e. -ether-phenyl-metaether-phenyl-sulphone-phenyl-/ -ether-phenyl-sulphone-phenyl-) and unit (b) in combination with units (f) and (g) (i.e. -ether-phenyl-metaether-phenyl-sulphone-phenyl-/ -ether-phenyl-sulphone-phenyl-/-ether-phenyl-ketone-phenyl-ether-phenyl-sulphone-phenyl-).

In general terms, said polymeric material is preferably substantially stable when used as a PEM in a fuel cell.

Thus, it suitably has high resistance to oxidation, reduction and hydrolysis and has very low permeability to reactants in the fuel cell. Preferably, however, it has a high proton conductivity. Furthermore, it suitably has high mechanical strength and is capable of being bonded to other components which make up a membrane electrode assembly.

Said polymeric material may comprise a film, suitably having a thickness of less than 1 mm, preferably less than 0.5 mm, more preferably less than 0.1 mm, especially less than 0.05 mm. The film may have a thickness of at least 5 μm.

Said polymer electrolyte membrane may comprise one or more layers wherein, suitably, at least one layer comprises a film of said polymer. Said membrane may have a thickness of at least 5 μm and, suitably, less, than 1 mm, preferably less than 0.5 mm, more preferably less than 0.1 mm, especially less than 0.05 mm.

The polymer electrolyte membrane suitably includes a layer of a catalyst material, which may be a platinum catalyst (i.e. platinum containing) or a mixture of platinum and ruthenium, on both sides of the polymer film. Electrodes may be provided outside the catalyst material.

Said polymer electrolyte or gas diffusion electrode may be for a fuel cell or electrolyte.

Said polymer electrolyte membrane may have an equivalent weight (EW) of less than 1000 g/mol, suitably less than 800 g/mol, preferably less than 600 g/mol, more preferably less than 500 g/mol. Preferably the equivalent weight (EW) is in the range 400-500 g/mol, especially 450-500 g/mol.

According to a second aspect of the invention, there is provided a fuel cell or electrolyser (especially a fuel cell) incorporating a polymer electrolyte membrane according to said first aspect.

Ion-conducting polymeric materials of the type described may have applications other than a part of a polymer electrolyte membrane or gas diffusion electrode. Accordingly, in a third aspect, the invention extends to an ion-conducting polymeric material as described according to said first aspect per se.

Said ion-conducting polymeric material of the third aspect may have any feature of the material described according to the first aspect.

The equivalent weight (EW) of the ion-conducting polymeric material may be as described above according to said first aspect. However, the ion-conducting polymer material may be used in situations wherein very low equivalent weight materials may be of utility. For example the EW may be as low as 144.

According to a fourth aspect of the invention, there is provided any novel polymer described according to said first or third aspects, in the absence of said groups which provide ion-exchange sites.

Polymeric materials as described herein may be made by analogy to the processes described in WO 00/15691 and hereinafter and the contents of the aforementioned document (especially page 23 line 23 to page 29 line 6) are incorporated herein by reference.

According to a fifth, aspect of the present invention, there is provided a method of making a sulphonated ion-conducting polymeric material as described herein, the method comprising contacting a polymeric material which includes a repeat unit of formula A as described above with a sulphonating agent thereby to substitute the repeat unit on average with more than 1 and 3 or less sulphonate groups.

The method preferably includes predetermining the level of sulphonation required and selecting suitable conditions to effect the sulphonation. Thus, the method suitably involves controllably sulphonating the polymeric material. Preferred conditions for controllably sulphonating the polymeric material involve the use of sulphuric acid, suitably at a concentration of at least 9-9.5%, preferably at least 99.8%, more preferably of at least 99.9%. The sulphuric acid concentration is preferably less than 100.1% and preferably about 100%. The temperature is preferably above ambient temperatures and may be 30° C. or above, preferably 32° C. or above, more preferably 34° C. or above. The temperature may be 40° C. or less, preferably 38° C. or less, especially 36° C. or less. A preferred temperature range is 34° C. to 36° C. with 35° C. being preferred. The selected temperature or temperature range may be maintained for at least 2, preferably at least 4, more preferably at least 6, especially at least 7 hours. The temperature or temperature range may be maintained for less than 20, preferably less than 15, more preferably less than 10, especially less than 9 hours. By selecting a sulphuric acid concentration and temperature of sulphonation as described it is possible to achieve di-sulphonation of substantially all of the moieties of formula A in the polymeric material. Preferred conditions involve use of 99.8% to 100% sulphuric acid (more preferably 100% sulphuric acid) at. 34° C.-36° C., suitably for 4 to 10 hours.

The method of the fifth aspect is preferably selected so that substantially no difficult to sulphonate units as described above (e.g. phenyl moieties bonded to sulphone or carbonyl groups) are sulphonated.

Preferably, in the method, substantially the only moieties in said polymeric material which are provided with ion-exchange sites are said moieties of formula A.

Specific embodiments of the invention will now be described, by way of example, with reference to the accompanying drawings, in which.

Figure 1:
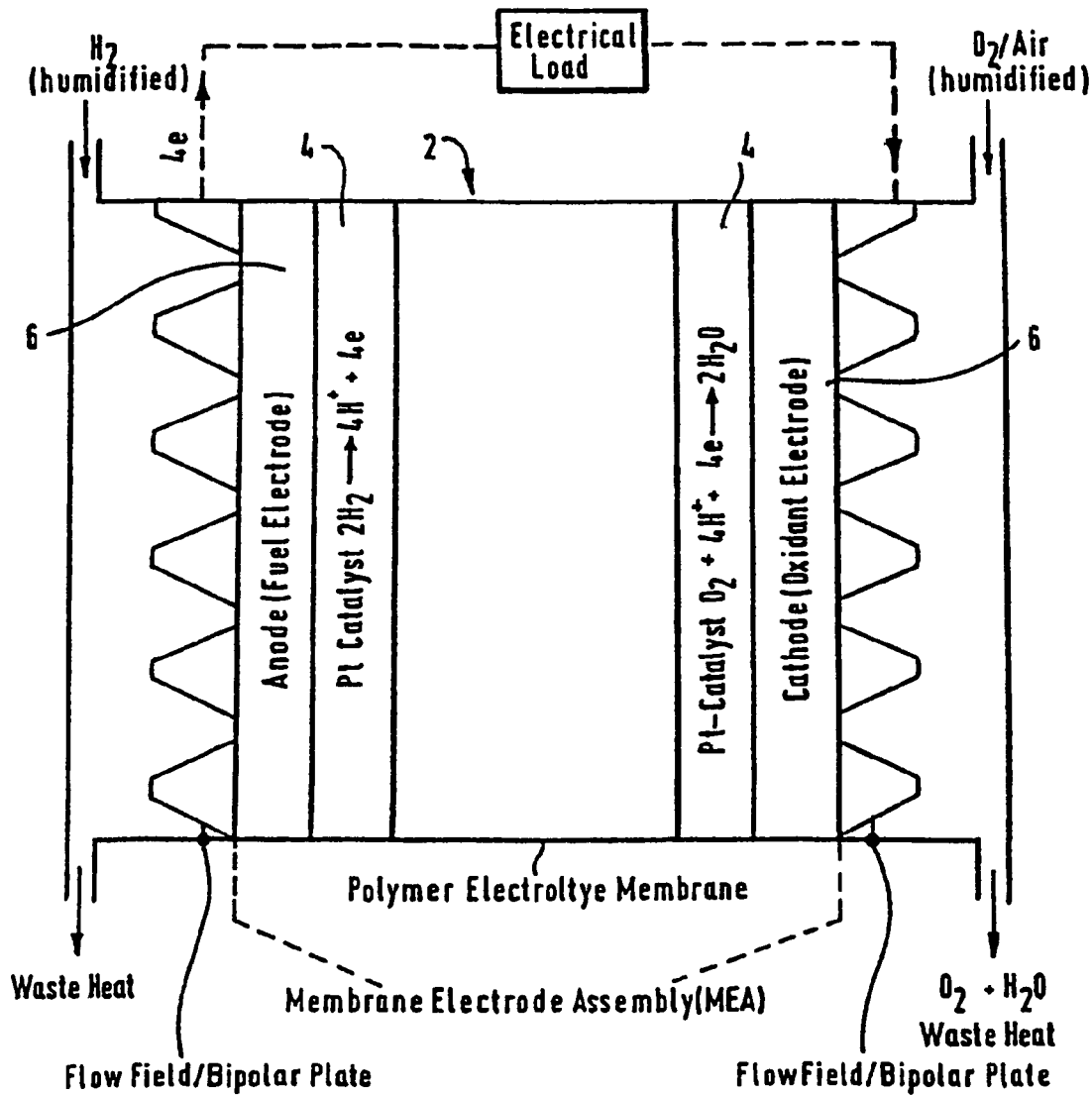
FIG. 1 is a representation of a polymer electrolyte membrane fuel cell as referred to above.

All chemicals referred to were used as received from Sigma-Aldrich Chemical Company, Dorset, UK, unless otherwise stated.

The following materials are referred to hereinafter:
PEEK (Trade Mark)—polyetheretherketone obtained from Victrex plc of England.
PEK (Trade Mark)—polyetherketone obtained from Victrex plc of England.
PEmEK—polyether-meta-etherketone

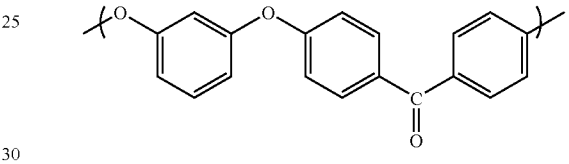

PEKES—polyetherketoneethersulphone
PEmE—polyether-meta-ethersulphone
PEDEK—polyetherbiphenyletherketone
SPEEK—sulphonated polyetheretherketone
SPEK—sulphonated polyetherketone
BDF—4,4'-difluorobenzophenone
DHB—4,4—-dihydroxybenzophenone
Res—1,3-dihydroxybenzene
Bis-S—4,4,-dihydroxydiphenylsulphone Examples 1 to 3. describe methods of preparing polymers. Example 4 describes the exclusive mono-sulphonation of polymers containing the PEmEK unit.

Example 5 describes a method to produce a range of polymers with greater than 1 but less than 2 sulphonic acid groups per meta oxysubstituted phenylene rings.

Example 6 describes an NMR procedure whilst example 7 describes sulphonation at increased acid concentrations.

Example 8 describes the exclusive di-sulphonation of PEmEK units within the described copolymers.

Example 9 provides an example of the dissolution but non sulphonation of PEK units under the conditions described in example 8.

Examples 10 and 11 provide evidence that attempts to increase or decrease the temperature in the methods described in example 8 result in the undesired sulphonation of PEK units or the incomplete disulphonation of PEmEK units respectively.

Examples 12 and 13 describe the sulphonation of PEK and PEEK to provide polymers for the thermal stability experiments described in Example 14.

EXAMPLE 1a

Synthesis of PEmEK/PEK (55:45)

A 700 ml flanged flask fitted with a ground glass Quickfit lid, stirrer/stirrer guide, nitrogen inlet and outlet was charged with 4,4'-difluorobenzophenone (88.85 g, 0.407 mole), 4,4'-dihydroxybenzophenone (38.56 g, 0.18 mole), 1,3-dihydroxybenzene (24.22 g, 0.22 mole) and diphenylsulphone (320 g) and purged with nitrogen for over 1 hour. The contents were then heated under a nitrogen blanket to between 140 and 150° C. to form an almost colourless solution. While maintaining a nitrogen blanket, dried sodium carbonate (42.39 g, 0.400 mole) and dried potassium carbonate (1.10 g, 0.008 mole) were added. The temperature was raised gradually to 320° C. over 3 hours and then maintained for 1.5 hours.

The reaction mixture was allowed to cool, milled and washed with acetone and water. The resulting polymer was dried in an air oven at 120° C. The polymer had a melt viscosity of 1.00 kNsm$^{-2}$.

A similar polymer to example 1a was made by altering the mole ratios of the reactants. The details are included in the table below.

| Example | Polymer Composition mole ratio | | | MV (kNsm$^{-2}$) |
|---|---|---|---|---|
| | BDF | DHB | Resorcinol | |
| 1b | 1.017 | 0.705 | 0.295 | 0.43 |

EXAMPLE 2a

Synthesis of PEmEK/PEK/PEKES

A 700 ml flanged flask fitted with a ground glass Quickfit lid, stirrer/stirrer guide, nitrogen inlet and outlet was charged with 4,4'-difluorobenzophenone (88.85 g, 0.407 mole), 1,3-dihydroxybenzene (24.75 g, 0.225 mole), 4,4'-dihydroxybenzophenone (15.01 g, 0.07 mole), 4,4'-dihydroxydiphenylsulphone (26.31 g, 0.105 mole) and diphenylsulphone (320 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) and dried potassium carbonate (0.28 g, 0.002 mole) were added. The temperature was raised gradually to 320° C. over 3 hours and then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 1.3 kNsm$^{-2}$.

Similar polymers to example 2a were made by altering the mole ratios of the reactants. The details are included in the table below.

| Example | Polymer Coomposition mole ratio | | | | MV (kNsm$^{-2}$) |
|---|---|---|---|---|---|
| | BDF | DHB | Res | Bis-S- | |
| 2b | 1.017 | 0.42 | 0.3 | 0.28 | 0.55 |
| 2c | 1.017 | 0.18 | 0.7 | 0.12 | 0.45 |
| 2d | 1.017 | 0.56 | 0.3 | 0.14 | 0.37 |
| 2e | 1.017 | 0.36 | 0.55 | 0.09 | 0.40 |
| 2f | 1.017 | 0.280 | 0.305 | 0.415 | 1.3 |

EXAMPLE 3

Synthesis of PEDEK/PEK/PEKES

A 700 ml flanged flask fitted with-a ground glass Quickfit lid, stirrer/stirrer guide, nitrogen inlet and outlet was charged with 4,4'-difluorobenzophenone (89. 03 g, 0.408 mole), 4,4'-dihydroxybenzophenone (11.43 g, 0.053 mole), 4,4'-dihydroxydiphenylsulphone (53.42 g, 0.214 mole) and 4,4'-dihydroxybiphenyl (24.80 g, 0.133 mole) and diphenylsulphone (320 g) and purged with nitrogen for over 1 hour. The contents were then heated under a nitrogen blanket to between 140 and 150° C. to form an almost colourless solution. While maintaining a nitrogen blanket, dried sodium carbonate (43.23 g, 0.408 mole) and dried potassium carbonate (0.40 g, 0.003 mole) were added. The temperature was raised gradually to 320° C. over 3 hours and then maintained for 2 hours.

The reaction mixture was allowed to cool, milled and washed with acetone and water. The resulting polymer was dried in an air oven at 120° C. The polymer had a melt viscosity at 400° C., 1000 sec$^{-1}$ of 0.49 kNsm$^{-2}$.

EXAMPLE 4

Sulphonation to Afford Exclusively Monosulphonated PEmEK Rings

A sample of polymer from example 2a was dissolved in 98% concentrated acid. The solution was stirred at room temperature for 24. hours. Thereafter, the reaction solution was allowed to drop into stirred de-ionised water. Sulphonated polymer precipitated as free-flowing beads. Recovery was by filtration, followed by washing with de-ionised water and subsequent drying.

The beads were found to have an EW of 690 corresponding to double the theoretical EW of 345, for di-sulphonation of all PEmEK units. EW results and 1H NMR spectroscopy showed that the PEmEK rings had undergone exclusively monosulphonation.

EXAMPLE 5

Sulphonation to Produce Between 1 and 2 Sulphonic Acid Moieties on Each 1,3-oxysubstituted Phenylene Ring Selected polymers from Examples 1-3 were sulphonated by stirring each polymer in 98% sulphuric acid (7.50 g of polymer/100 g sulphuric acid) for various time periods and temperatures. Thereafter, the reaction solution was allowed to drip into stirred de-ionised water. Sulphonated polymer precipitated as free-flowing beads.

Recovery was by filtration, followed by washing with de-ionised water and subsequent drying.

The measured and theoretical EW's of the polymers sulphonated under these conditions are shown in the table below. In some examples, the sulphonation time or temperature was increased to produce a larger number of di-sulphonated PEmEK units. Additionally, the table details the percentage of di-sulphonated resorcinol moieties, determined as described in Example 6.

| Sulphonated Polymer from Example | Theoretical EW+ | Temp (° C.) | Time (hours) | Measured EW (by titration) | Percentage of di-sulphonated resorcinol moieties (by EW or NMR) |
|---|---|---|---|---|---|
| 2f | 690 | 65 | 8 | 1053 | 48% |
| 1b | 690 | 65 | 60 | 890 | 83% |
| 2b | 690 | 80 | 8 | 752 | 91% |
| 3 | 690 | 65 | 8 | 692 | N/A |

N/A—Not Applicable
+Based on a fully di-sulphonated PEmEK Unit (except for Example 3 which has no such unit)

It should be noted that 98% sulphuric acid is unable to sulphonate PEK units in the polymers due to the deactivation of the phenyl ring of the PEK unit by the attached ketone group.

EXAMPLE 6

General Procedure for Calculating Percentage Di-Sulphonation by Proton NMR

Figure 2:
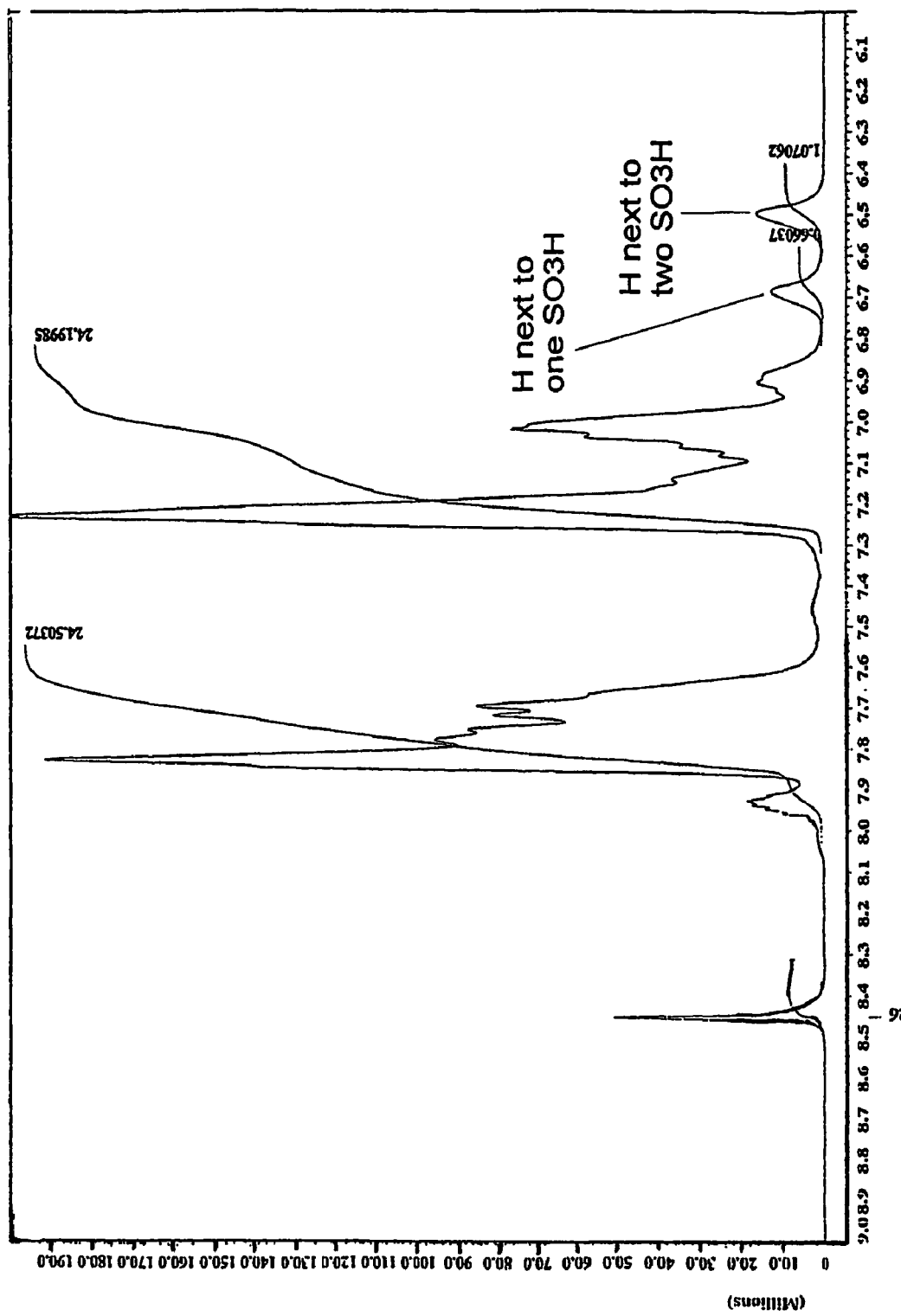
FIG. 2 is proton-NMR spectrum for a SPEmEK/PEK copolymer.

The NMR determination of the level of di-sulphonation was derived by rationing the integral of the peak at 6.5 ppm divided by half the integral of the peak at 6.75 plus the integral of the peak at 6.5 ppm). The resonance at 6.5 ppm corresponds to the proton placed between two ether linkages which experiences significant electron shielding from the ether linkages and the meta directing effect of both sulphonic acid groups (Scheme 1b). The proton signal at 6.7 ppm represents both protons in a mono-sulphonated 1,3-ether linked phenylene as indicated in Scheme 1a and shown in the NMR spectrum of a SPEmEK/PEK copolymer (see FIG. 2).

Scheme 1(a)

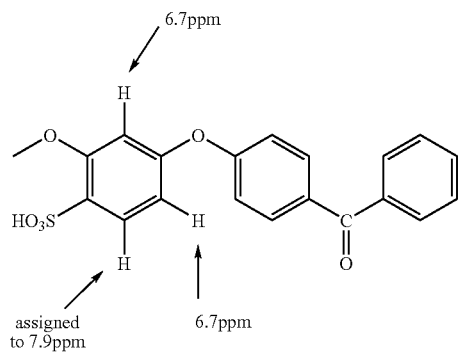

Scheme 1(b)

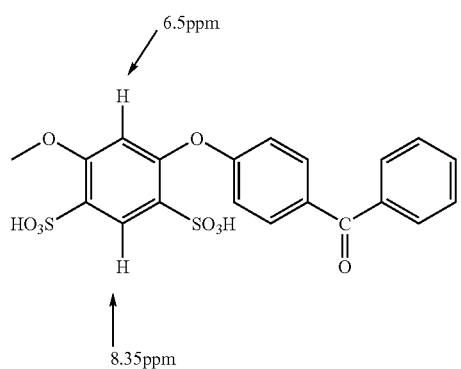

Complete di-sulphonation can be confirmed by comparing the actual EW to the theoretical EW providing that no signal at 6.7 ppm is present, or alternatively by rationing the signal at 6.5 ppm with the other proton signals from the polymer.

EXAMPLE 7

Sulphonation with Increased Acid Concentrations

A sample of polymer from example 2f was dissolved in 98% concentrated acid. To the solution was added 20% oleum in concentrated sulphuric acid to make the concentration of the concentrated sulphuric acid solution 99%. The solution was heated with stirring at 65° C. for 38 hours. Thereafter, the reaction solution was allowed to drip into stirred de-ionised water. Sulphonated polymer precipitated as free-flowing beads. Recovery was by filtration, followed by washing with de-ionised water and subsequent drying.

The above procedure afforded polymer with an EW of 803 (83.6% disulphonation from EW results). IR analysis did not reveal the presence of sulphonated PEK rings.

EXAMPLE 8

Sulphonation to Afford Exclusively Di-Sulphonated PEmEK Rings

A sample of polymer from example 2f was dissolved in 98% concentrated acid. To the solution was added 20% oleum in concentrated sulphuric acid to make the concentration of the concentrated sulphuric acid solution 100%. The solution was heated with stirring at 35° C. for 8 hours. Thereafter, the reaction solution was cooled to room temperature and allowed to drip into stirred de-ionised water. Sulphonated polymer precipitated as free-flowing beads. Recovery was by filtration, followed by washing with de-ionised water and subsequent drying.

The beads were found to have an EW corresponding to the theoretical EW of 690. Examination of the beads by 1H NMR spectroscopy (i.e. determining the ratio of the protons corresponding to the di-sulphonated and monosulphonated meta substituted ether-phenylene-ether rings) suggested that all PEmEK moieties within the polymer chain had been exclusively di-sulphonated such that where a 1,3-oxy-phenylene-oxylinkage occurred, sulphonic acid groups were present at the 4- and 6-positions. Furthermore, the IR spectrum of the polymer did not contain a stretch associated with sulphonic acid groups on -ether-phenylene-ketone moieties, thereby confirming that no PEK or PEKES units had undergone sulphonation.

EXAMPLE 9

Sulphonation of PEK in 100% Sulphuric Acid at 35° C.

A sample of PEK polymer was dissolved in 98% concentrated acid. To the solution was added 20% oleum in concentrated sulphuric acid to make the concentration of the concentrated sulphuric acid solution 100%. The solution was heated with stirring at 350° C. for 8 hours. Thereafter, the reaction solution was cooled to room temperature and allowed to drip into stirred de-ionised water. The polymer precipitated as free-flowing beads. Recovery was by filtration, followed by washing with de-ionised water and subsequent drying.

The EW of the beads could not be measured since a positive phenolphthalein test result was immediately observed on addition of sodium hydroxide, suggesting that the polymer had not undergone sulphonation. Furthermore, the IR spectrum of the polymer did not contain a stretch associated with sulphonic acid groups on -ether-phenylene-ketone moieties, thereby confirming that no PEK units had undergone sulphonation.

EXAMPLE 10

Sulphonation of PEMEK/PEK/PEKES in 100% Sulphuric Acid at 45° C.

A sample of polymer from example 2f was dissolved in 98% concentrated acid. To the solution was added 20% oleum in concentrated sulphuric acid to make the concentration of the concentrated sulphuric acid solution 100%. The solution was heated with stirring at 45° C. for 8 hours. Thereafter, the reaction solution was cooled to room temperature and allowed to drip into stirred de-ionised water. The sulphonated polymer precipitated as free-flowing beads. Recovery was by filtration, followed by washing with de-ionised water and subsequent drying.

The EW of the polymer was determined as 683, however analysis of the polymer by infrared spectroscopy showed clear evidence that the PEK units had undergone sulphonation.

EXAMPLE 11

Sulphonation of PEMEK/PEK/PEKES in 100% Sulphuric Acid at Room Temperature

A sample of polymer from example 2f was dissolved in 98% concentrated acid. To the solution was added 20% oleum in concentrated sulphuric acid to make the concentration of the concentrated sulphuric acid solution 100 %. The solution was stirred at room temperature for 24 hours. Thereafter, the reaction solution was cooled to room temperature and allowed to drip into stirred de-ionised water. The polymer precipitated as free-flowing beads. Recovery was by filtration, followed by washing with de-ionised water and subsequent drying.

Analysis of the polymer by NMR suggested that only 66% of the PEmEK rings had been disulphonated.

EXAMPLE 12

Sulphonation of PEK with Greater Than 100% Sulphuric Acid

A sample of PEK polymer was dissolved in 98% concentrated acid. To the solution was added 20% oleum in concentrated sulphuric acid to make the concentration of the concentrated sulphuric acid solution >100%. The solution. was heated with stirring at 50° C. for 1 hour and 10 minute's hours. Thereafter, the reaction solution was cooled to room temperature and allowed to drip into stirred de-ionised water. The sulphonated polymer precipitated as free-flowing beads. Recovery was by filtration, followed by washing with de-ionised water and subsequent drying.

The EW of the polymer was determined as 845.

EXAMPLE 13

Sulphonation of PEEK in 98% Sulphuric Acid at 65° C.

A sample of PEEK polymer was dissolved in 98% concentrated acid. The solution was heated with stirring at 65° C. for 1 hour and 30 minutes. Thereafter, the reaction solution was cooled to room temperature and allowed to drip into stirred de-ionised Water. The sulphonated polymer precipitated as free-flowing beads. Recovery was by filtration, followed by washing with de-ionised water and subsequent drying.

The EW of the polymer was determined as 557.

EXAMPLE 14

Thermal Stability Experiments

The thermal stability of selected sulphonated polymers was determined by placing the sulphonated polymer beads in a PTFE-lined flask and exposing the beads to temperatures of 200° C. in air, for a period of 1 hour and 45 minutes. The beads were then subjected to EW testing to determine the loss of ion exchange sites after thermal treatment at these temperatures. The results from these experiments are shown in the table below.

| Sulphonated polymer from specified example or named polymer | Level of sulphonation | Original EW | EW after thermal treatement | % change |
|---|---|---|---|---|
| 12 | Mono-sulphonated rings stabilised by carbonyl | 845 | 985 | 17% |
| 13 | Mono-sulphonated rings | 557 | 687 | 23% |
| 2d | Majority of PEmEK rings di-sulphonated (>85%) but some monosulphonated rings present | 799 | 810 | 1.4% |
| 2f | PEmEK rings fully di-sulphonated | 690 | 699 | 1.3% |
| 2a | Monosulphonated PEmEK rings | 715 | 904 | 26% |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polymer electrolyte membrane or gas diffusion electrode which includes an ion-conducting polymeric material which includes moieties of formula A

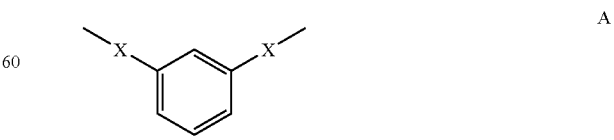

which are substituted on average with more than, but not equal to, 1 and 3 or less groups which provide ion-exchange sites and hydrogen atoms of said moieties are optionally substituted, wherein each X in said moieties of formula A independently represent an oxygen or sulphur atom.

2. The membrane or the electrode according to claim 1, wherein said moieties are substituted on average with 1.8 to 2.2 of said groups which provide ion-exchange sites.

3. The membrane or the electrode according to claim 1, wherein said ion conducting polymeric material is of a type which includes:
carbonyl and/or sulphone moieties.

4. The membrane or the electrode according to claim 1, wherein said ion conducting polymeric material includes a moiety of formula I

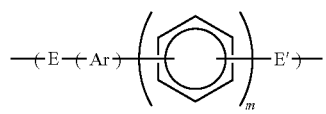

I and/or a moiety of formula II

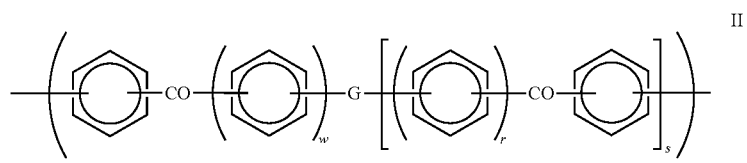

II and/or a moiety of formula III

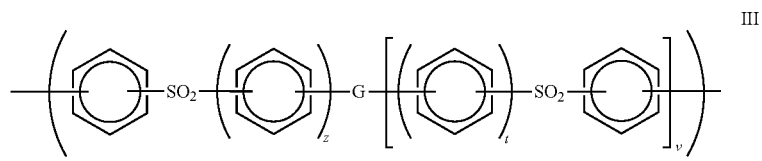

III wherein at least some of the units I, II and/or III are functionalised to provide ion-exchange sites, wherein unit A is a part of units I, II and/or III, wherein phenyl moieties in units I, II, and III are independently optionally substituted and optionally cross-linked; and wherein m,r,s,t,v,w and z independently represent zero or a positive integer, E and E' independently represent an oxygen or a sulphur atom or a direct link, G represents an oxygen or sulphur atom, a direct link or a -O-Ph-O- moiety where Ph represents a phenyl group and Ar is selected from one of the following moieties (i)* or (i) to (x) which is bonded via one or more of its phenyl moieties to adjacent moieties:

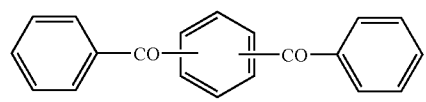

(i)*

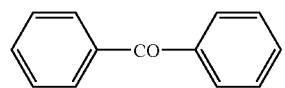

(i)

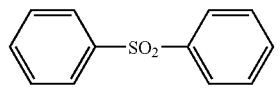

(ii)

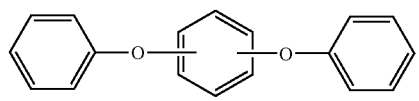

(iii)

(iv)

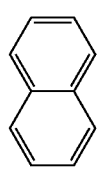

(v)

-continued

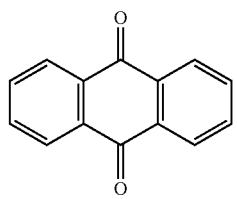

(vi)

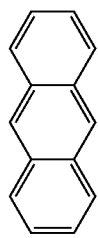

(vii)

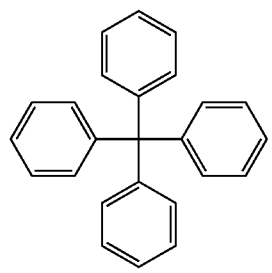
(viii)

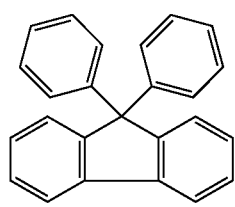
(ix)

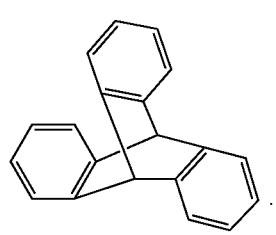
(x)

5. The membrane or the electrode according to claim 4, wherein said polymeric material is a homopolymer having a repeat unit of general formula

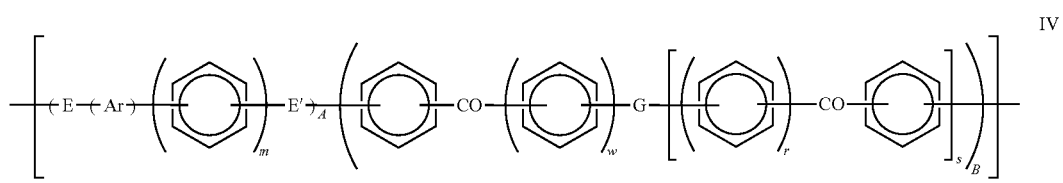
IV or a homopolymer having a repeat unit of general formula

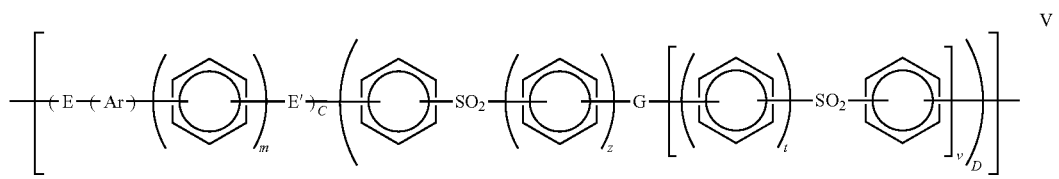
V or a random or block copolymer of at least two different units of IV and/or V provided that repeat units (or parts of repeat unit) are functionalised to provide ion-exchange sites;

or a homopolymer having a repeat unit of general formula

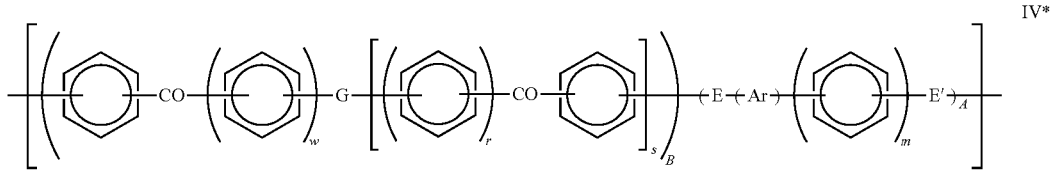

IV* or a homopolymer having a repeat unit of general formula

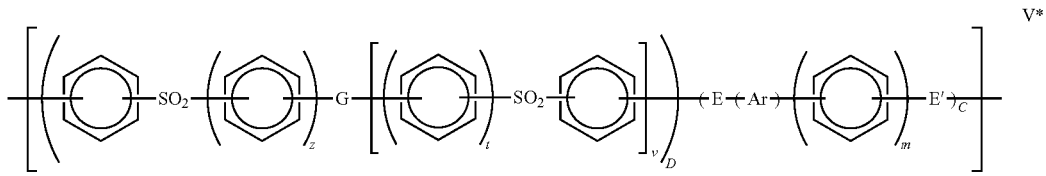

V* or a random or block copolymer of at least two different units of IV* and/or V* provided that one or more repeat units (or parts of repeat units) are functionalised to provide ion-exchange sites;

wherein A, B, C, and D independently represent 0 or 1 and E, E', G, Ar, m, r, s, t, v, w and z are as described in claim 4.

6. The membrane or the electrode according to claim 1, wherein said ion-conducting polymeric material is sulphonated.

7. The membrane or the electrode according to claim 1, wherein said ion-conducting polymeric material is crystalline or crystallisable.

8. The membrane or the electrode according to claim 1, wherein said polymeric material includes at least some ketone moieties in the polymeric chain.

9. The membrane or the electrode according to claim 1, wherein said ion-conducting polymeric material includes a repeat unit of formula 10. The membrane or the electrode according to claim 9, wherein Y represents a carbonyl group and X represents an oxygen atom.

11. The membrane or the electrode according to claim 1, wherein any -O-phenyl-CO or -O-phenyl-$SO_2$ moieties in said ion-conducting polymeric material are provided with ion-exchange sites to a level of less than 10 mole %.

12. The membrane or the electrode according to claim 1, wherein moieties A are the only moieties in said ion-conducting polymeric material which are provided with ion exchange sites.

13. The membrane or the electrode according to claim 1, wherein substantially 100 mole % of moieties A are disubstituted with groups which provide ion-exchange sites.

14. The membrane or the electrode according to claim 1, wherein said polymer electrolyte membrane has an equivalent weight (EW) of less than 500g/mol.

15. A fuel cell or electrolyser incorporating a polymer electrolyte membrane according to claim 1.

16. An ion conducting polymeric material which includes an ion-conducting polymeric material which includes moieties of formula A

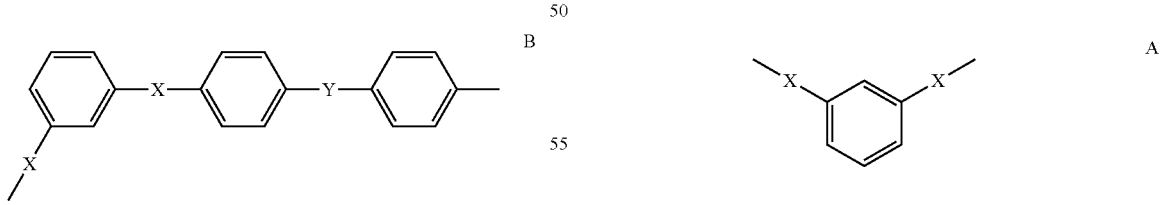

wherein the 1,3- substituted -X-Phenyl-X- moiety is substituted on average with more than 1 and 3 or fewer groups which provide ion-exchange sites, each X independently represents an oxygen or sulphur atom and Y represents a carbonyl or sulphone group.

which are substituted on average with more than, but not equal to, 1 and 3 or less groups which provide ion-exchange sites and hydrogen atoms of said moieties are optionally substituted, wherein each X in said moieties of formula A independently represent an oxygen or sulphur atom.

* * * * *